United States Patent
Li

(10) Patent No.: US 12,526,845 B2
(45) Date of Patent: Jan. 13, 2026

(54) METHOD AND APPARATUS FOR REQUESTING OTHER SYSTEM INFORMATION, AND DEVICE MEDIUM

(71) Applicant: BEIJING XIAOMI MOBILE SOFTWARE CO., LTD., Beijing (CN)

(72) Inventor: Yanhua Li, Beijing (CN)

(73) Assignee: BEIJING XIAOMI MOBILE SOFTWARE CO., LTD., Beijing (CN)

( * ) Notice: Subject to any disclaimer, the term of this patent is extended or adjusted under 35 U.S.C. 154(b) by 491 days.

(21) Appl. No.: 18/014,140

(22) PCT Filed: Jul. 9, 2020

(86) PCT No.: PCT/CN2020/101161
§ 371 (c)(1),
(2) Date: Dec. 30, 2022

(87) PCT Pub. No.: WO2022/006824
PCT Pub. Date: Jan. 13, 2022

(65) Prior Publication Data
US 2023/0276501 A1   Aug. 31, 2023

(51) Int. Cl.
*H04W 74/0833* (2024.01)
(52) U.S. Cl.
CPC ............... *H04W 74/0833* (2013.01)
(58) Field of Classification Search
None
See application file for complete search history.

(56) References Cited

U.S. PATENT DOCUMENTS

| | | | |
|---|---|---|---|
| 11,653,290 B2 * | 5/2023 | Basu | H04W 4/06 370/252 |
| 2018/0027595 A1 | 1/2018 | Wang et al. | |
| 2018/0270868 A1 * | 9/2018 | Ou | H04W 74/004 |
| 2018/0288810 A1 | 10/2018 | Ishii | |
| 2019/0166622 A1 * | 5/2019 | Kim | H04W 74/00 |

(Continued)

FOREIGN PATENT DOCUMENTS

| CN | 106575996 A | 4/2017 |
|---|---|---|
| CN | 109089225 A | 12/2018 |

(Continued)

OTHER PUBLICATIONS

ZTE, ZTE Microelectronics, "4-step Random Access Procedure" 3GPP TSG RAN WG1 AH_NR Meeting, R1-1701581, Athens, Greece, Jan. 13-17, 2017, (13p).
International Search Report issued in Application No. PCT/CN2020/101161 dated Mar. 30, 2021 with English translation, (4p).
CNOA1 of Chinese Application No. 202080001506.8 with partial English translation, (12p).

(Continued)

*Primary Examiner* — Hassan A Phillips
*Assistant Examiner* — Gautam Sharma
(74) *Attorney, Agent, or Firm* — Arch & Lake LLP; Hao Tan; Shen Wang

(57) ABSTRACT

A method for requesting other system information includes: sending by a terminal, a random access preamble to a network device, with the random access preamble being used for requesting other system information; acquiring scheduling information for a random access response; and receiving the random access response according to the scheduling information of the random access response, with the random access response carrying response information associated with the other system information.

18 Claims, 6 Drawing Sheets

(56) References Cited

U.S. PATENT DOCUMENTS

| | | | |
|---|---|---|---|
| 2020/0045743 A1* | 2/2020 | Lee | H04W 74/0833 |
| 2020/0178305 A1 | 6/2020 | Chen et al. | |
| 2020/0288377 A1* | 9/2020 | Liu | H04W 48/14 |
| 2020/0351757 A1* | 11/2020 | You | H04W 74/0833 |
| 2023/0276501 A1* | 8/2023 | Li | H04W 48/14 |
| | | | 370/329 |
| 2025/0106864 A1* | 3/2025 | Basu Mallick | H04W 74/0833 |

FOREIGN PATENT DOCUMENTS

| | | |
|---|---|---|
| CN | 109089303 A | 12/2018 |
| CN | 109152002 A | 1/2019 |
| CN | 111095986 A | 5/2020 |
| CN | 111107661 A | 5/2020 |
| WO | 2018014247 A1 | 1/2018 |

OTHER PUBLICATIONS

ZTE, "Consideration on the Other SI Delivery in NR", 3GPP TSG-RAN WG2 Meeting #95bis, R2-166343, Kaohsiung, Oct. 10-14, 2016, (6p).

3rd Generation Partnership Project; Technical Specification Group Radio Access Network; Evolved Universal Terrestrial Radio Access (E-UTRA); Radio Resource Control (RRC); Protocol specification (Release 17),3GPP TS 36.331 V17.2.0 (Sep. 2022), (p. 1126).

First CNOA of Application No. 202080001506.8 dated on Sep. 8, 2022 with English translation,(12p).

Ericsson, "Parameters for Random Access preamble groups when SSBs are configured", 3GPP TSG-RAN WG2 #100, Tdoc R2-1713479 Reno, Nevada, USA, Nov. 27-Dec. 1, 2017, (6p).

ASUSTeK. "Random access procedure for SI request", GPP TSG-RAN WG2 Meeting #101, R2-1801894, Athens, Greece, Feb. 26-Mar. 2, 2018, (2p).

* cited by examiner

METHOD AND APPARATUS FOR REQUESTING OTHER SYSTEM INFORMATION, AND DEVICE MEDIUM

CROSS REFERENCE TO RELATED APPLICATION

This application is a National Stage of International Application No. PCT/CN2020/101161, filed on Jul. 9, 2020, the entire disclosure of which is incorporated by reference herein for all purposes.

TECHNICAL FIELD

This application relates to the field of wireless communication, and in particular to a method and apparatus for requesting other system information, and device and medium.

BACKGROUND

In the New Radio (NR) system, there are two types of system information: minimum System Information and other System Information. The minimum SI is always sent by broadcast, while the other SI is selectively sent by broadcast by the network device based on requests from users (User Equipment).

SUMMARY

The embodiments of the present disclosure provide a method and apparatus for requesting other system information, and device and medium. The technical solution is as follows.

According to a first aspect of the present disclosure, a method for requesting other system information is provided, including:
  sending a random access preamble to a network device, wherein the random access preamble is used for requesting other system information;
  acquiring scheduling information for a random access response; and
  receiving the random access response according to the scheduling information for the random access response, wherein the random access response carries response information associated with the other system information.

According to a second aspect of the present disclosure, there is provided a method for requesting other system information, including:
  receiving a random access preamble, wherein the random access preamble is used for requesting other system information;
  broadcasting scheduling information for a random access response; and
  sending the random access response according to the scheduling information for the random access response, wherein the random access response carries response information associated with the other system information.

According to a third aspect of the present disclosure, there is provided a terminal, including: a processor; a transceiver connected to the processor; and a memory for storing instructions executable by the processor, wherein the processor is configured to load and execute the executable instructions to implement methods for requesting other system information described above.

According to an aspect of the present disclosure, there is provided a network device, including: a processor; a transceiver connected to the processor; and a memory for storing instructions executable by the processor, wherein the processor is configured to load and execute the executable instructions to implement methods for requesting other system information described above.

According to an aspect of the present disclosure, there is provided a computer readable storage medium having executable instructions stored therein, wherein the executable instructions are loaded and executed by a processor to implement methods for requesting other system information described above.

According to an aspect of the present disclosure, there is provided a computer program product, wherein executable instructions are stored in the readable storage medium, the executable instructions are loaded and executed by a processor to implement methods for requesting other system information described above.

According to an aspect of the present disclosure, there is provided a chip, wherein the chip is used to implement methods for requesting other system information described above.

BRIEF DESCRIPTION OF THE DRAWINGS

In order to more clearly illustrate the technical solutions in the embodiments of the present disclosure, the following is a brief description of the accompanying drawings that need to be used in the description of the embodiments. The accompanying drawings in the following description are only some of the embodiments of the present disclosure, and other accompanying drawings can be obtained based on these drawings without creative work for a person of ordinary skill in the art.

DETAILED DESCRIPTION

Figure 1:
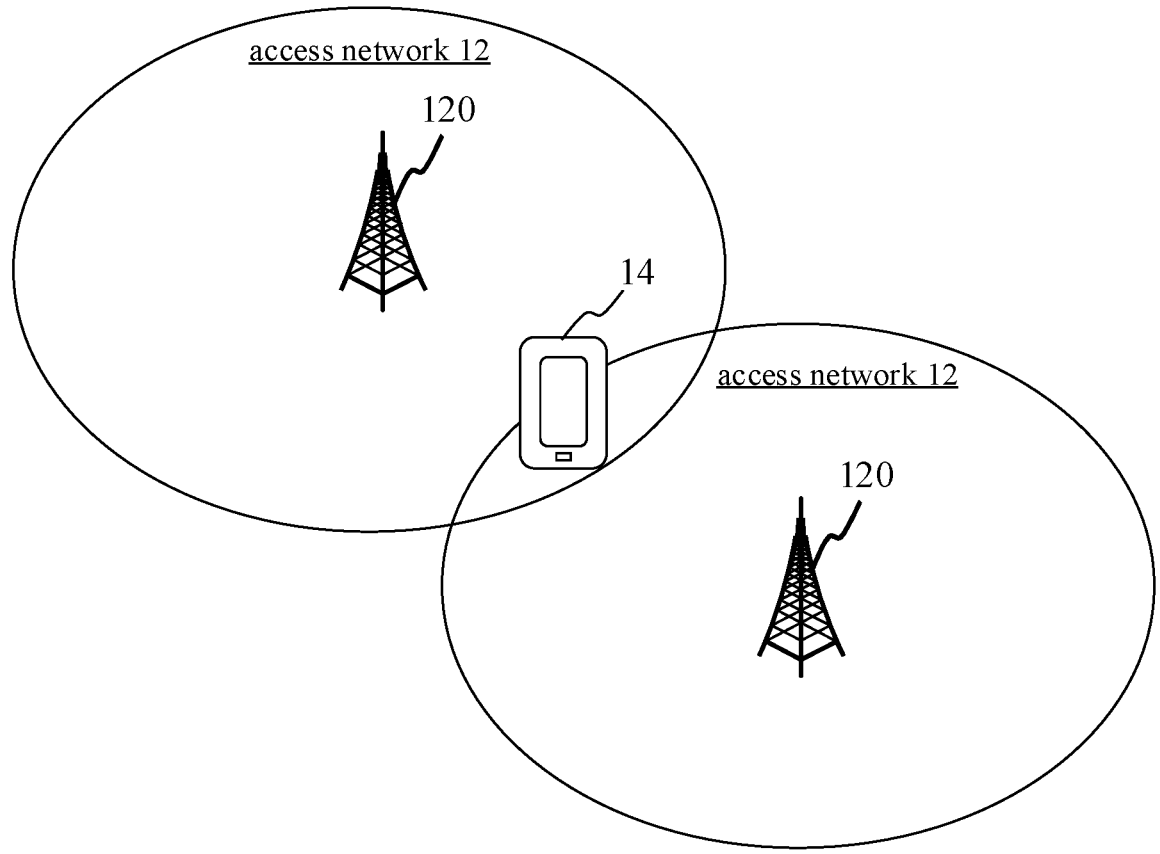
FIG. 1 is a block diagram of a communication system provided by an exemplary embodiment of the present disclosure.

In order to make the purpose, technical solutions and advantages of the present disclosure clearer, the embodiments of the present disclosure will be described in further detail below in conjunction with the accompanying drawings.

The minimum System Information includes: a Master Information Block (MIB) and a first System Information Block 1 (SIB1). The first system information block includes: information required for the cell to access and scheduling information of other system information (other SI). The scheduling information of the other SI is used to indicate whether the network device broadcasts the other SI, whether the modification occurs and on which time-frequency resource it broadcasts. The other system information includes SIB3, SIB4, SIB5, etc. These system information can each be broadcasted independently.

The other SI can be requested from the network device in an on demand form according to needs of the terminals themselves. In an example of related technology, the terminal can use message 1 (msg1) in a four-step random access process to obtain the information. If the network device reserves a random access preamble resource for acquiring other SI, the acquisition process of the terminal is as follows.

Step 1: the terminal sends message 1, which carries the preamble code used to request the other SI.

Step 2: the terminal determines the random access response (RAR) window in accordance with the timing relationship specified by the physical layer protocol.

Step 3: before the RAR window has timed out, message 2 is monitored by monitoring the Random Access Radio Network Temporary Identity (RA-RNTI). If message 2 (RAR response) is obtained by monitoring and decoding, it is compared whether the first Random Access Preamble Identifier (RAPID) of message 2 matches with the second RAPID sent by the terminal itself. If there is a match, it means that a positive response of the network device is obtained. At this time, the network device will broadcast the requested other system information.

Step 4: If the message 2 is still not received after the timer times out, or the first RAPID and the second RAPID in the received message 2 do not match, the request is considered to be failed.

In narrowband services, the Physical Downlink Control Channel Less (PDCCH Less) transmission for public messages has been introduced. Take Narrow Band Internet of Things (NB-IoT) based on cellular as an example, the scheduling information of SIB1 is notified to the terminal in the MIB, while the scheduling information of other SI is notified to the terminal in SIB1. Therefore, for the terminal, it can obtain the scheduling information of SIB1 directly after reading the MIB, and obtain the scheduling information of other SI directly after reading SIB1. In this way, the terminal can reduce monitoring and decoding of system information and reduce the implementation complexity of the terminal.

After introducing a terminal of low-cost and low-implementation complexity in lightweight NR (NR-lite), it is necessary to consider how to reduce the monitoring of the terminal and reduce the implementation complexity when acquiring system information in an on demand form.

FIG. 1 illustrates a block diagram of a communication system provided in an exemplary embodiment of the present disclosure. The communication system may include: an access network 12 and a terminal 14.

The access network 12 includes a number of network devices 120. The network device 120 may be a base station. The base station is a device deployed in the access network to provide wireless communication functions for the terminal. The base station may include various forms of macro base stations, micro base stations, relay stations, access points, etc. In systems using different wireless access technologies, the names of the devices having the base station functionality may vary. For example, in LTE systems, it is called eNodeB or eNB; in 5G NR systems, it is called gNodeB or gNB. The description "base station" may change as the communication technology evolves. For convenience, in embodiments of the application, the above devices that provide wireless communication functions for the terminal 14 are collectively referred to as network devices.

The terminal 14 may include various handheld devices, on-board devices, wearable devices, computing devices or other processing devices connected to a wireless modem, and various forms of user devices, mobile stations (MS), terminal devices, etc., that have wireless communication functions. For ease of description, the above mentioned devices are collectively referred to as terminals. The network device 120 and the terminal 14 communicate with each other through some kind of air interface technology, such as a Uu interface.

The technical solution of this application can be applied to various communication systems, such as Global System of Mobile communication (GSM) system, Code Division Multiple Access (CDMA) system, Wideband Code Division Multiple Access (WCDMA) system, General Packet Radio Service (GPRS) system, Long Term Evolution (LTE) system, LTE Frequency Division Duplex (FDD) system, LTE Time Division Duplex (TDD) system, Advanced long term evolution (LTE-A) system, New Radio System (NR) system, an evolved system of the NR system, LTE-based access to unlicensed spectrum (LTE-U) system, NR-U system, Universal Mobile Telecommunication System (UMTS), Worldwide Interoperability for Microwave Access (WiMAX) communication system, Wireless Local Area Networks (WLAN), Wireless Fidelity (WiFi), next Generation Communication System or other communication systems, etc.

Generally speaking, traditional communication systems support a limited number of connections and it is easy to implement. However, as communication technologies evolve, mobile communication systems will support not only traditional communication, but also support, for example, Device to Device (D2D) communication, Machine to Machine (M2M) communication, Machine Type Communication (MTC), Vehicle to Vehicle (V2V) communication, and Vehicle to everything (V2X) systems, etc. Embodiments of the present disclosure can also be applied to these communication systems.

Figure 2:
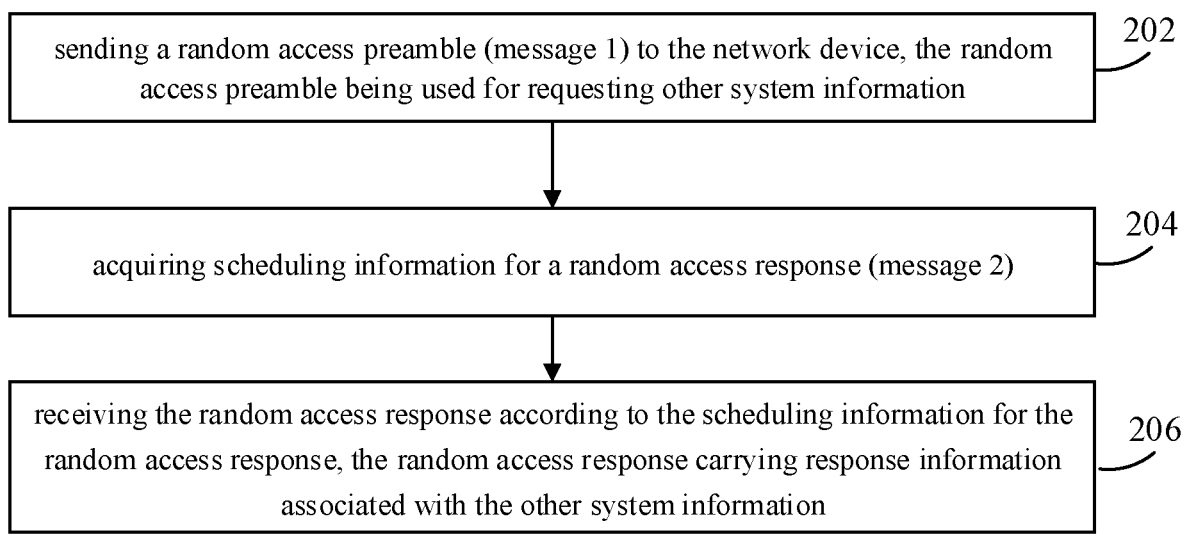
FIG. 2 is a flowchart of a method for requesting other system information provided by an exemplary embodiment of the present disclosure.

FIG. 2 illustrates a flow chart of a method for requesting other system information provided by an exemplary embodiment of the present disclosure. This embodiment may be performed by a terminal, such as an NR-lite terminal. The method includes following steps.

Step 202, a random access preamble (message 1) is sent to the network device. The random access preamble is used for requesting other system information.

The network device broadcasts the reserved resources of the random access preamble in the minimum system information. Optionally, there exists a portion of the random access preamble that is used to request other SI based on demand.

The random access preamble is sent to the network device when the terminal needs to request other SI. The random access preamble is used to request the network device to broadcast other system information.

Step 204, scheduling information for a random access response (message 2) is acquired.

In one implementation, the terminal obtains the scheduling information for the random access response (message 2) from the minimum system information. In another implementation, the terminal obtains the scheduling information for the random access response (message 2) predefined by the protocol.

The scheduling information for the random access response includes, but not limited to, at least one of: time domain resource, frequency domain resource, Modulation and coding Scheme (MCS) and Transformer Block Size (TBS).

The time domain resource is the resource occupied by the network device in the time domain dimension when sending the random access response, and the frequency domain resource is the resource occupied by the network device in the frequency domain dimension when sending the random access response. The MCS is the modulation coding format used in sending the random access response. The TBS is the corresponding transformer block size when sending the random access response.

Step 206, the random access response is received according to the scheduling information for the random access response. The random access response carries response information associated with the other system information.

The terminal receives the random access response based on the scheduling information for the random access response on the resources indicated by the time domain resources and the frequency domain resources. The random access response carries response information.

In some embodiments, the response information includes a broadcast identifier. The broadcast identifier is used to indicate success or failure of a request against the other system information. The broadcast identifier is one bit or one bit bitmap, for example, a bitmap pre-configured by the network device, or predefined by a communication protocol. When the broadcast identifier is a first value, it indicates that the network device agrees to the request and will broadcast other system information. When the broadcast identifier is a second value, it indicates that the network device does not agree to the request and the request fails.

In some other embodiments, the response information includes a first RAPID. When the first RAPID matches the second RAPID sent by the terminal itself, it indicates that the network device agrees to the request and will broadcast other system information. When the first RAPID does not match the second RAPID sent by the terminal itself, it indicates that the network device does not agree to the request and the request fails.

In some other embodiments, the response information includes the first RAPID and the broadcast identifier. When the first RAPID matches the second RAPID sent by the terminal itself and the broadcast identifier is the first value, it indicates that the network device agrees to the request and will broadcast other system information. When the first RAPID does not match the second RAPID sent by the terminal itself or the broadcast identifier is the second value, it indicates that the network device does not agree to the request and the request fails.

In summary, through the method provided by this embodiment, by acquiring the scheduling information for the random access response in advance and receiving the random access response according to the time-frequency resources indicated by the scheduling information, the terminal does not need to use the manner of monitoring to receive the random access response and does not need to decode the RA-RNTI, thereby reducing the monitoring and decoding of the terminal in receiving message 2 and lowering the implementation complexity of the terminal.

Figure 3:
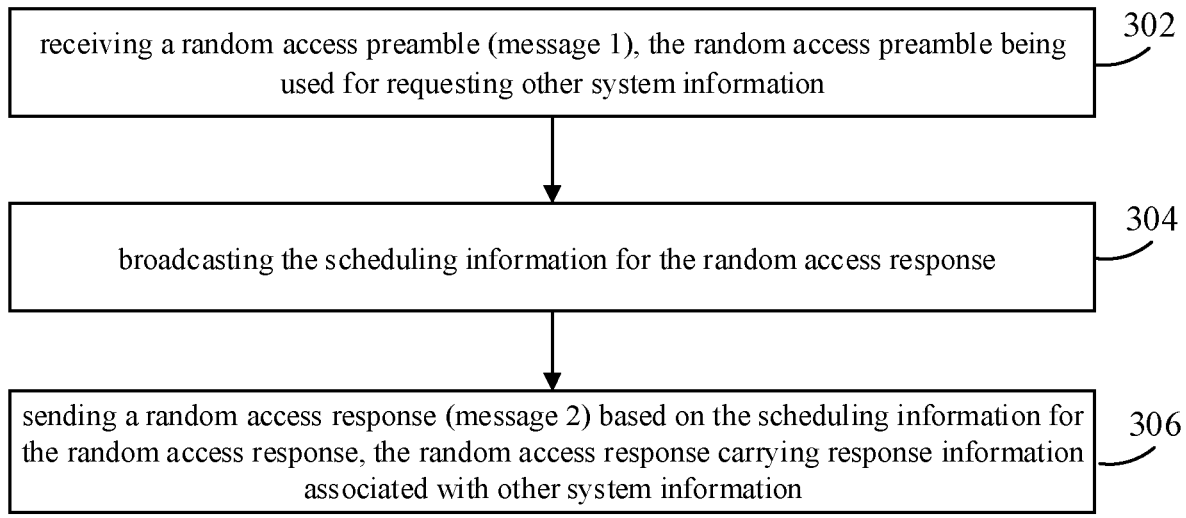
FIG. 3 is a flowchart of a method for requesting other system information provided by an exemplary embodiment of the present disclosure.

FIG. 3 illustrates a flowchart of a method for requesting other system information provided by an exemplary embodiment of the present disclosure. The method includes following steps.

Step 302, a random access preamble (message 1) is received. The random access preamble is used for requesting other system information.

The network device broadcasts the reserved resources of the random access preamble in the minimum system information. Optionally, there exists a portion of the random access preamble that is used to request other SI based on demand.

The random access preamble is sent to the network device when the terminal needs to request other SI. The random access preamble is used to request the network device to broadcast other system information. The network device receives the random access preamble.

Step 304, the scheduling information for the random access response is broadcasted.

The network device broadcasts scheduling information for the random access response (message 2) in the minimum system information.

The scheduling information for the random access response includes, but not limited to, at least one of: time domain resource, frequency domain resource, Modulation and coding Scheme (MCS) and Transformer Block Size (TBS).

The time domain resource is the resource occupied by the network device in the time domain dimension when sending the random access response, and the frequency domain resource is the resource occupied by the network device in the frequency domain dimension when sending the random access response. The MCS is the modulation coding format used in sending the random access response. The TBS is the corresponding transformer block size when sending the random access response.

Step 306, a random access response (message 2) is sent based on the scheduling information for the random access response. The random access response carries response information associated with other system information.

In one implementation, the scheduling information directly indicates the time and/or frequency resources or the like used to send the random access response, so that the terminal can receive the random access response directly based on the scheduling information, thereby eliminating the need to wait for the entire RAR window time.

In one implementation, the scheduling information may indicate the location information of the target time point for receiving the random access response relative to the RAR window, to enable the terminal to determine the relative location of the target time point after determining the RAR window, thereby saving the signaling overhead.

The network device sends a random access response based on the scheduling information for the random access response on the resources indicated by the time-domain resources and the frequency-domain resources. The random access response carries response information.

For example, if the response information is the first value, it indicates that the network device agrees to the request and will broadcast other system information. If the response information is the second value, it indicates that the network device does not agree to the request and the request fails.

In summary, through the method provided by this embodiment, by broadcasting the scheduling information for the random access response in advance and receiving the random access response according to the time-frequency resources indicated by the scheduling information, the terminal does not need to use the manner of monitoring to receive the random access response and does not need to decode the RA-RNTI, thereby reducing the monitoring and decoding of the terminal in receiving message 2 and lowering the implementation complexity of the terminal.

Figure 4:
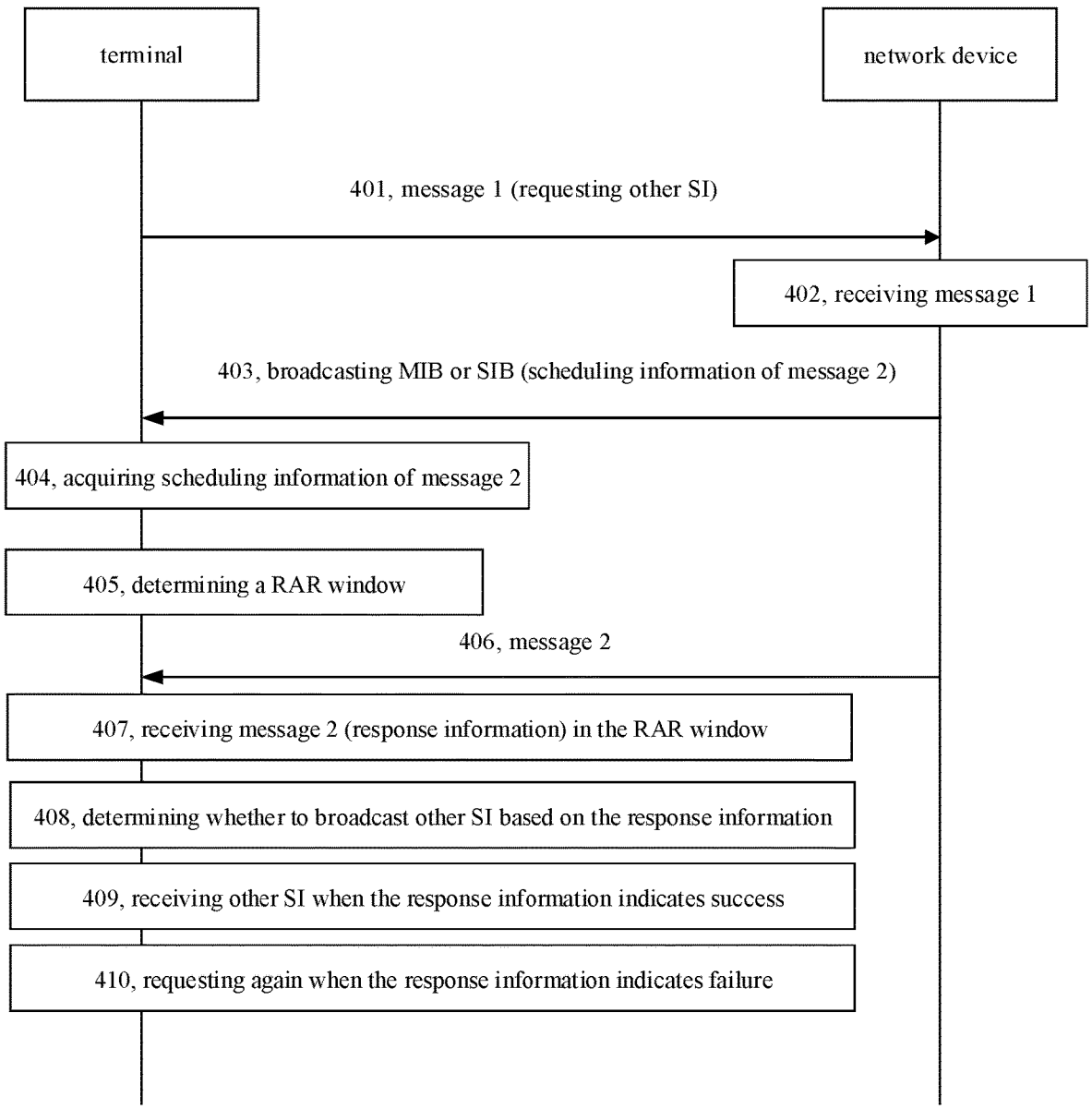
FIG. 4 is a flowchart of a method for requesting other system information provided by an exemplary embodiment of the present disclosure.

FIG. 4 illustrates a flowchart of a method for requesting other system information provided by an exemplary embodiment of the present disclosure. The method includes following steps.

Step 401, the terminal sends a random access preamble (message 1) to the network device. The random access preamble is used for requesting other system information.

The network device broadcasts the reserved resources of the random access preamble in the minimum system information. Optionally, there exists a portion of the random access preamble that is used to request other SI based on demand.

The random access preamble is sent to the network device when the terminal needs to request other SI. Optionally, the random access preamble corresponds to a second Random Access Preamble Identifier (RAPID).

Step 402, the network device receives the random access preamble (message 1). The random access preamble is used to request other system information.

Step 403, the network device broadcasts scheduling information for the random access response.

Optionally, the scheduling information for the random access response is configured based on each other system information. That is, the network device is configured based on each type of Other SI requests received. For example, for UE requesting a first Other SI, the first scheduling information is configured; for UE requesting a second Other SI, the second scheduling information is configured.

The network device broadcasts the scheduling information for the random access response (message 2) in the minimum system information. In one implementation, the network device broadcasts the MIB, which carries the scheduling information for the random access response. In another implementation, the network device broadcasts the SIB, which carries the scheduling information for the random access response.

The scheduling information for the random access response includes, but not limited to, at least one of: time domain resource, frequency domain resource, Modulation and coding Scheme (MCS) and Transformer Block Size (TBS).

The time domain resource is the resource occupied by the network device in the time domain dimension when sending the random access response, and the frequency domain resource is the resource occupied by the network device in the frequency domain dimension when sending the random access response. The MCS is the modulation coding format used in sending the random access response. The TBS is the corresponding transformer block size when sending the random access response.

Step 404, the terminal acquires scheduling information for the random access response.

The terminal receives the scheduling information for the random access response (message 2) in the minimum system information. In one implementation, the terminal receives the MIB, which carries the scheduling information for the random access response. In another implementation, the terminal receives the SIB1, which carries the scheduling information for the random access response.

Step 405, the terminal determines a Random Access Response (RAR) window according to a timing relationship.

For example, after the random access preamble (Msg1) is sent, the RAR window is determined in accordance with the timing relationship at the physical layer.

For example, the window length of this RAR window is T2. T2 is indicated by a parameter ra-ResponseWindow pre-configured by the network device.

Step 406, the network device sends a random access response (message 2) based on the scheduling information for the random access response. The random access response carries the response information associated with other system information.

The network device sends the random access response using the scheduled MCS and TBS formats on the resources indicated by the time domain resources and the frequency domain resources according to the scheduling information for the random access response. The random access response carries response information.

If the response information is the first value, it indicates that the network device agrees to the request and will broadcast other system information. If the response information is the second value, it indicates that the network device does not agree to the request and the request fails.

Step 407, the terminal receives a random access response in the RAR window based on the scheduling information.

The terminal determines the target time point in the RAR window and receives the random access response at the target time point according to the scheduling information. The target time point may be determined by the UE by itself.

In one implementation, the time point may be indicated by carrying information indicating the time domain position of the target time point relative to the RAR window in the scheduling information, for example, information indicating a difference between the target time point and the start moment of the RAR window, or indicating a difference between the target time point and the end moment of the RAR window.

In one implementation, the difference between the target time point and the start moment of the RAR window is less than a threshold value and the UE may go to read it immediately after the start of the RAR window, which helps to reduce the delay.

In another implementation, the difference between the target time point and the end moment of the RAR window is less than the threshold, and the UE can go to read at the moment when the RAR window is about to end, which is conducive to saving power since the UE can enter a sleep state transitorily before reading.

In some embodiments, the terminal also determines the number of receptions by itself. The number of receptions refers to the maximum number of attempts to receive in the RAR window. The random access response is received in the RAR window according to this number of receptions.

Step 408, the terminal determines, based on the response information, whether the network device broadcasts other system information.

Optionally, the response information includes: a broadcast identifier; or, a first RAPID.

The broadcast identifier is one bit or one bitmap. The bitmap is pre-configured by the network device, or pre-defined by the communication device.

In the case where the response information carries the broadcast identifier, the terminal decodes from the random access response to obtain the broadcast identifier. When the broadcast identifier is a first value, the terminal determines that the network device broadcasts other system information. When the broadcast identifier is a second value, the terminal determines that the network device does not broadcast other system information. In one example, the broadcast identifier is one bit, the first value is 1, and the second value is 0. In another example, the broadcast identifier is a 4-bit bitmap, the first value is 1111, and the second value is 0000.

In the case where the response information carries the first RAPID, the first RAPID is obtained by decoding from the random access response. When the first RAPID matches the second RAPID in the random access preamble, the terminal determines that the network device broadcasts other system information. When the first RAPID does not match the second RAPID in the random access preamble, the terminal determines that the network device does not broadcast other system information.

In the case where the response information carries both the first RAPID and the broadcast identifier, the first RAPID and the broadcast identifier are obtained by decoding from the random access response. When the first RAPID matches the second RAPID sent by the terminal itself and the broadcast identifier is the first value, it indicates that the network device agrees to this request and will broadcast other system information. When the first RAPID does not match the second RAPID sent by the terminal itself or the broadcast identifier is the second value, it indicates that the network device does not agree to the request and the request fails.

Step 409, the terminal receives other system information when the response information indicates success.

Step 410, when the response information indicates failure, the terminal requests again or other processing.

In summary, through the method provided by this embodiment, by the terminal acquiring the scheduling information for the random access response in advance and receiving the random access response according to the time-frequency resources indicated by the scheduling information, the terminal does not need to use the manner of monitoring to receive the random access response and does not need to decode the RA-RNTI, thereby reducing the monitoring and decoding of the terminal in receiving message 2 and lowering the implementation complexity of the terminal.

In the method provided in this embodiment, by configuring one scheduling information of message 2 for each other SI requested respectively, the plurality of terminals requesting the same other SI can receive the same message 2, which reduces the number of messages 2 that need to be fed back by the network device.

Figure 5:
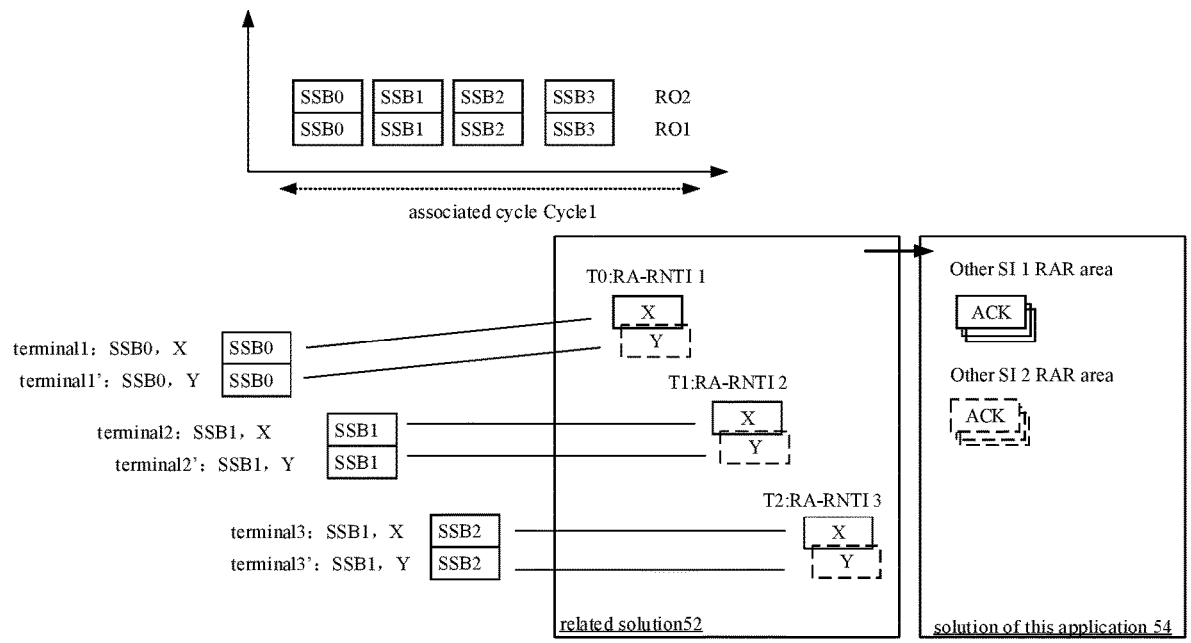
FIG. 5 is a time-frequency schematic diagram of a method for requesting other system information provided by an exemplary embodiment of the present disclosure.

In an example shown in FIG. 5, in a scenario where N is less than 1, N is a pre-configured or predefined parameter SSB-per-rach-occation, the network device is pre-configured to request Other SI1 using random access preamble X and request Other SI2 using random access preamble Y.

The technical solution 52 provided by the related technology is as follows.

The terminal 1 requests Other SI1 using the random access preamble X reserved by the network device at SSB0, and needs to monitor message 2 in the RAR window corresponding to T0. The message 2 is identified using RA-RNTI1. The terminal 2 requests Other SI1 using the random access preamble X reserved by the network device at SSB1, and needs to monitor message 2 in the RAR window corresponding to T1. The message 2 is identified using RA-RNTI2. The terminal 3 requests Other SI1 using the random access preamble X reserved by the network device at SSB2, and needs to monitor message 2 in the RAR window corresponding to T2. The message 2 is identified using RA-RNTI3.

The terminal 1' requests Other SI2 using the random access preamble Y reserved by the network device at SSB1, and needs to monitor message 2 in the RAR window corresponding to T0. The message 2 is identified using RA-RNTI1. The terminal 2' requests Other SI2 using the random access preamble Y reserved by the network device at SSB1, and needs to monitor message 2 in the RAR window corresponding to T1. The message 2 is identified using RA-RNTI2. The terminal 3' requests Other SI2 using the random access preamble Y reserved by the network device at SSB2, and needs to monitor message 2 in the RAR window corresponding to T2. The message 2 is identified using RA-RNTI3.

The terminal 1, terminal 2, and terminal 3 request Other SI1 and need to monitor different RA-RNTI resources. The terminal 1', terminal 2', and terminal 3' request Other SI2 and need to monitor different RA-RNTI resources. The terminal 1 and terminal 1' need to monitor the same RA-RNTI resource, the terminal 2 and terminal 2' need to monitor the same RA-RNTI resource, and the terminal 3 and terminal 3' need to monitor the same RA-RNTI resource.

The technical solution 54 provided by this application is as follows.

The network device schedules a first RAR area for Other SI1, carrying response information ACK. The terminal 1, terminal 2, and terminal 3 all receive message 2 in the first RAR area based on the scheduling information. The message 2 is used to identify that the network device will broadcast Other SI1.

The network device schedules a second RAR area for the Other SI2, carrying the response information ACK. The terminal 1', terminal 2' and terminal 3' all receive message 2 in the second RAR area according to the scheduling information. The message 2 is used to identify that the network device will broadcast the Other SI1.

In summary, the network device saves the time-frequency resources used to send message 2 and the terminal does not need to decode RA-RNTI.

Figure 6:
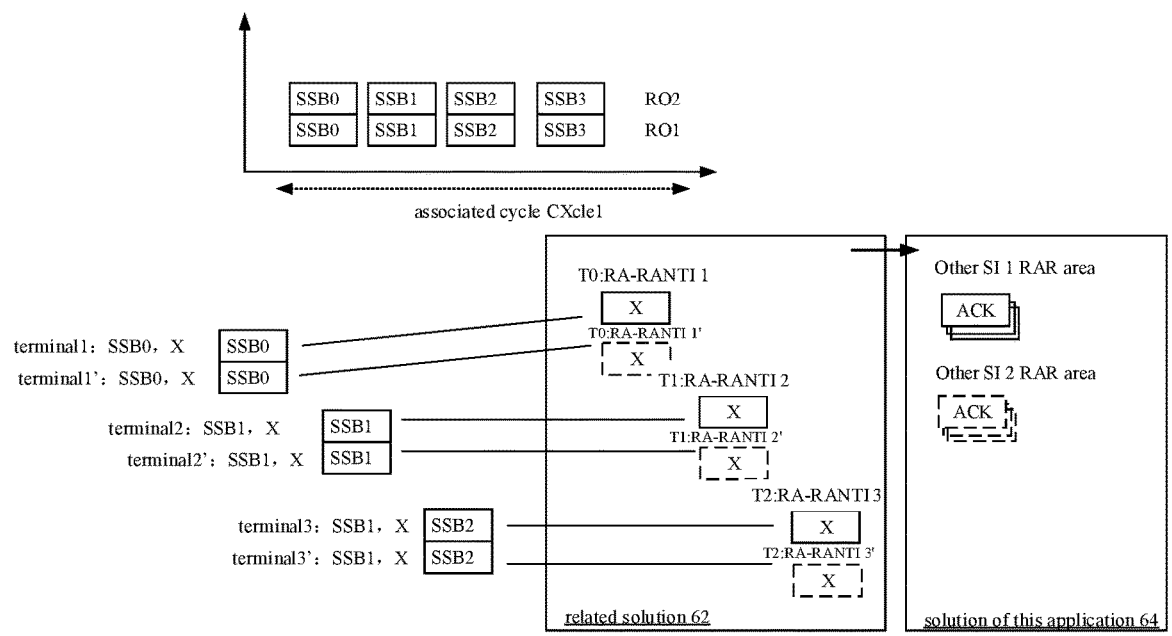
FIG. 6 is a time-frequency schematic diagram of a method for requesting other system information provided by an exemplary embodiment of the present disclosure.

In an example shown in FIG. 6, in a scenario where N is less than 1, the network device is pre-configured to request Other SI1 using random access preamble X and request Other SI2 using random access preamble X.

The technical solution 62 provided by the related technology is as follows.

The terminal 1 requests Other SI1 using the random access preamble X reserved by the network device at SSB0, and needs to monitor message 2 in the RAR window corresponding to T0. The message 2 is identified using RA-RNTI1. The terminal 2 requests Other SI1 using the random access preamble X reserved by the network device at SSB1, and needs to monitor message 2 in the RAR window corresponding to T1. The message 2 is identified using RA-RNTI2. The terminal 3 requests Other SI1 using the random access preamble X reserved by the network device at SSB2, and needs to monitor message 2 in the RAR window corresponding to T2. The message 2 is identified using RA-RNTI3.

The terminal 1' requests Other SI2 using the random access preamble X reserved by the network device at SSB1, and needs to monitor message 2 in the RAR window corresponding to T0. The message 2 is identified using RA-RNTI1'. The terminal 2' requests Other SI2 using the random access preamble X reserved by the network device at SSB1, and needs to monitor message 2 in the RAR window corresponding to T1. The message 2 is identified using RA-RNTI2'. The terminal 3' requests Other SI2 using the random access preamble X reserved by the network device at SSB2, and needs to monitor message 2 in the RAR window corresponding to T2. The message 2 is identified using RA-RNTI3'.

The terminal 1, terminal 2, and terminal 3 request Other SI1 and need to monitor different RA-RNTI resources. The terminal 1', terminal 2', and terminal 3' request Other SI2 and need to monitor different RA-RNTI resources. The terminal 1 and terminal 1' need to monitor different RA-RNTI resources, the terminal 2 and terminal 2' need to monitor different RA-RNTI resources, and the terminal 3 and terminal 3' need to monitor different RA-RNTI resources.

The technical solution 64 provided by this application is as follows.

The network device schedules a first RAR area for Other SI1, carrying response information ACK. The terminal 1, terminal 2, and terminal 3 all receive message 2 in the first RAR area based on the scheduling information. The message 2 is used to identify that the network device will broadcast Other SI1.

The network device schedules a second RAR area for the Other SI2, carrying the response information ACK. The terminal 1', terminal 2' and terminal 3' all receive message 2 in the second RAR area according to the scheduling information. The message 2 is used to identify that the network device will broadcast the Other SI1.

In summary, the network device saves the time-frequency resources used to send message 2 and the terminal does not need to decode RA-RNTI.

Figure 7:
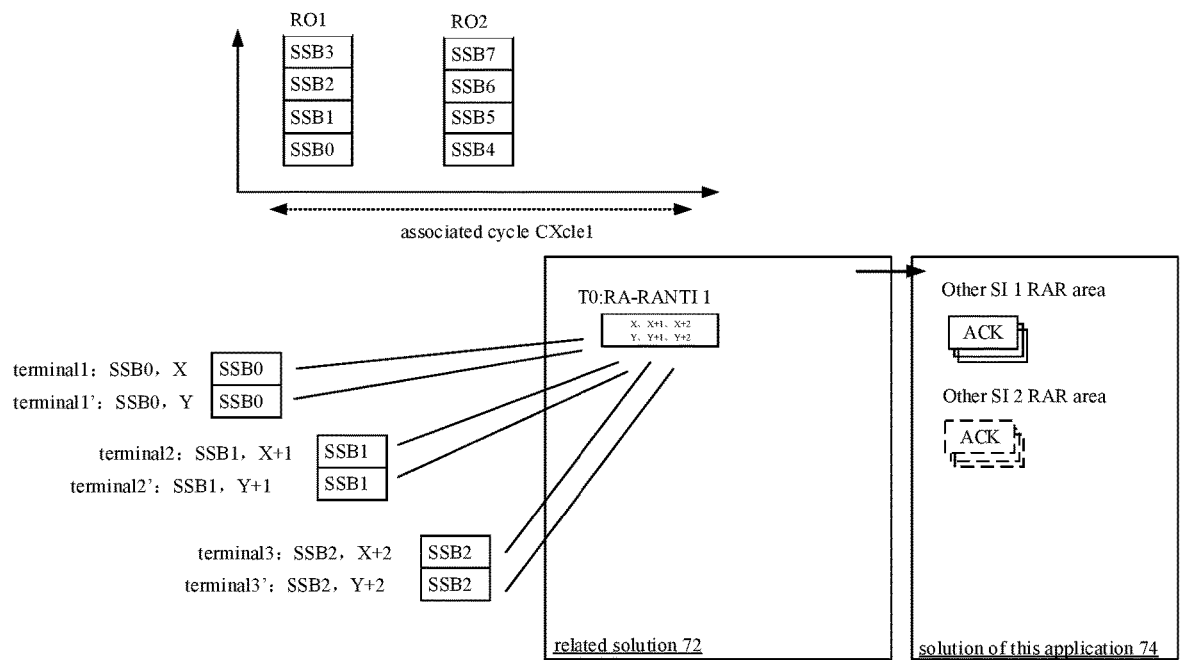
FIG. 7 is a time-frequency schematic diagram of a method for requesting other system information provided by an exemplary embodiment of the present disclosure.

In an example shown in FIG. 7, in a scenario where N is larger than 1, the network device is pre-configured to request Other SI1 using random access preamble X and request Other SI2 using random access preamble Y.

The technical solution 72 provided by the related technology is as follows.

The terminal 1 requests Other SI1 using the random access preamble X reserved by the network device at SSB0, and needs to monitor message 2 in the RAR window corresponding to T0. The message 2 is identified using RA-RNTI1. The terminal 2 requests Other SI1 using the random access preamble X+1 reserved by the network device at SSB1, and needs to monitor message 2 in the RAR window corresponding to T1. The message 2 is identified using RA-RNTI1. The terminal 3 requests Other SI1 using the random access preamble X+2 reserved by the network device at SSB2, and needs to monitor message 2 in the RAR window corresponding to T0. The message 2 is identified using RA-RNTI1.

The terminal 1' requests Other SI1 using the random access preamble Y reserved by the network device at SSB1, and needs to monitor message 2 in the RAR window corresponding to T0. The message 2 is identified using RA-RNTI1. The terminal 2' requests Other SI1 using the random access preamble Y+1 reserved by the network device at SSB1, and needs to monitor message 2 in the RAR window corresponding to T0. The message 2 is identified using RA-RNTI1. The terminal 3' requests Other SI1 using the random access preamble Y+2 reserved by the network device at SSB2, and needs to monitor message 2 in the RAR window corresponding to T0. The message 2 is identified using RA-RNTI1.

The terminal 1, terminal 2, terminal 3, terminal 1', terminal 2', and terminal 3' need to monitor the same RA-RNTI resource. The network device needs to prepare 6 RAR responses to be sent in the same message 2, resulting in that the message will be very large.

The technical solution 74 provided by this application is as follows.

The network device schedules a first RAR area for Other SI1, carrying response information ACK. The terminal 1, terminal 2, and terminal 3 all receive message 2 in the first RAR area based on the scheduling information. The message 2 is used to identify that the network device will broadcast Other SI1.

The network device schedules a second RAR area for the Other SI2, carrying the response information ACK. The terminal 1', terminal 2' and terminal 3' all receive message 2 in the second RAR area according to the scheduling information. The message 2 is used to identify that the network device will broadcast the Other SI1.

In summary, the network device saves the time-frequency resources used to send message 2 and the terminal does not need to decode RA-RNTI.

Figure 8:
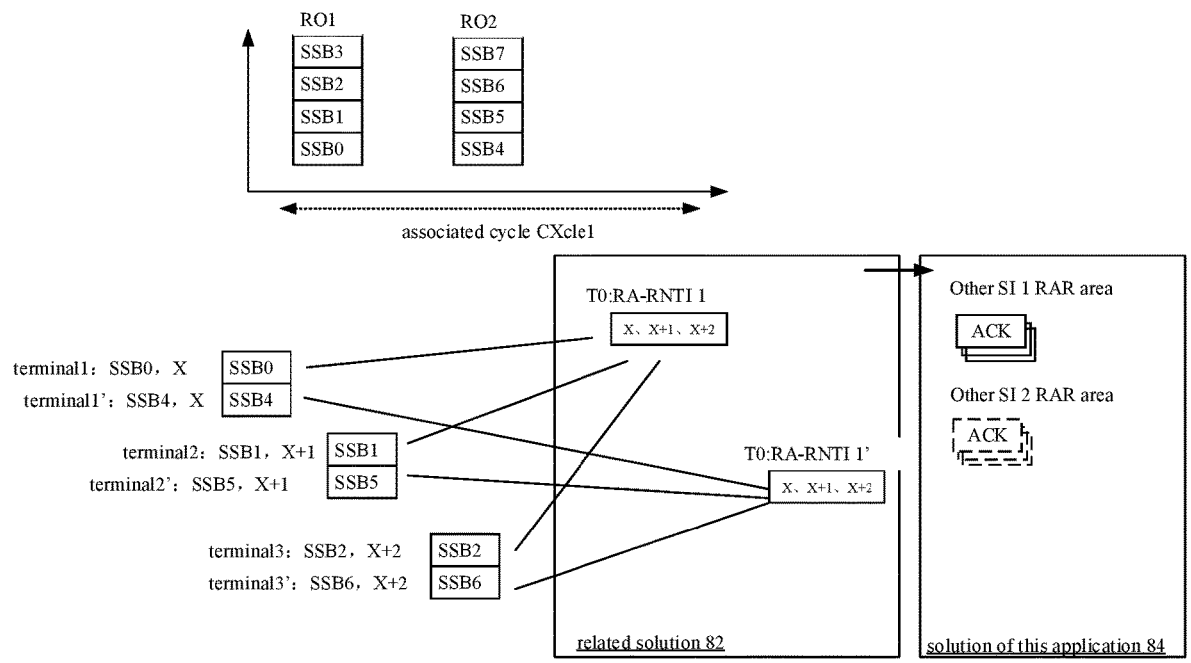
FIG. 8 is a time-frequency schematic diagram of a method for requesting other system information provided by an exemplary embodiment of the present disclosure.

In an example shown in FIG. 8, in a scenario where N is larger than 1, the network device is pre-configured to request Other SI1 and Other SI2 using random access preamble X.

The technical solution 82 provided by the related technology is as follows.

The terminal 1 requests Other SI1 using the random access preamble X reserved by the network device at SSB0, and needs to monitor message 2 in the RAR window corresponding to T0. The message 2 is identified using RA-RNTI1. The terminal 2 requests Other SI1 using the random access preamble X+1 reserved by the network device at SSB1, and needs to monitor message 2 in the RAR window corresponding to T0. The message 2 is identified using RA-RNTI1. The terminal 3 requests Other SI1 using the random access preamble X+2 reserved by the network device at SSB2, and needs to monitor message 2 in the RAR window corresponding to T0. The message 2 is identified using RA-RNTI1.

The terminal 1' requests Other SI1 using the random access preamble X reserved by the network device at SSB4, and needs to monitor message 2 in the RAR window corresponding to T0. The message 2 is identified using RA-RNTI1'. The terminal 2' requests Other SI1 using the random access preamble X+1 reserved by the network device at SSB5, and needs to monitor message 2 in the RAR window corresponding to T0. The message 2 is identified using RA-RNTI1'. The terminal 3' requests Other SI1 using the random access preamble X+2 reserved by the network device at SSB6, and needs to monitor message 2 in the RAR window corresponding to T0. The message 2 is identified using RA-RNTI1'.

The terminal 1, terminal 2, and terminal 3 need to monitor the same one RA-RNTI resource; the terminal 1', terminal 2', and terminal 3' need to monitor the same another RA-RNTI resource. The network device needs to prepare 3 RAR responses to be sent in the same message 2, and needs to prepare another 3 RAR responses to be sent in another message 2, resulting in that the message will be large.

The technical solution 84 provided by this application is as follows.

The network device schedules a first RAR area for Other SI1, carrying response information ACK. The terminal 1, terminal 2, and terminal 3 all receive message 2 in the first RAR area based on the scheduling information. The message 2 is used to identify that the network device will broadcast Other SI1.

The network device schedules a second RAR area for the Other SI2, carrying the response information ACK. The terminal 1', terminal 2' and terminal 3' all receive message 2 in the second RAR area according to the scheduling information. The message 2 is used to identify that the network device will broadcast the Other SI1.

In summary, the network device saves the time-frequency resources used to send message 2 and the terminal does not need to decode RA-RNTI.

Figure 9:
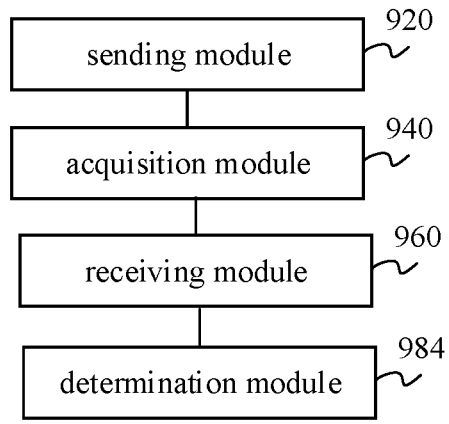
FIG. 9 is a block diagram of an apparatus for requesting other system information provided by an exemplary embodiment of the present disclosure.

FIG. 9 illustrates a block diagram of an apparatus for requesting other system information provided by an exemplary embodiment of the present disclosure. The apparatus can be implemented as a terminal or part of a terminal. The apparatus includes:

- a sending module 920, configured to send a random access preamble to a network device, wherein the random access preamble is used for requesting other system information;
- an acquisition module 940, configured to acquire scheduling information for a random access response; and
- a receiving module 960, configured to receive the random access response according to the scheduling information for the random access response, wherein the random access response carries response information associated with the other system information.

In an optional embodiment of this embodiment, the acquisition module 940 is configured to receive a master information block MIB broadcast by the network device, wherein the MIB carries the scheduling information for the random access response;

or, the acquisition module 940 is configured to receive a first system information block SIB1 broadcast by the network device, wherein the SIB1 carries the scheduling information for the random access response;

or, the acquisition module 940 is configured to acquire predefined scheduling information for the random access response.

In an optional embodiment of this embodiment, the scheduling information for the random access response includes at least one of:

time domain resource, frequency domain resource, Modulation and coding Scheme MCS and Transformer Block Size TBS.

In an optional embodiment of this embodiment, the scheduling information for the random access response is configured respectively based on different other system information.

In an optional embodiment of this embodiment, the response information includes: a broadcast identifier, wherein the broadcast identifier is used to indicate success or failure of a request against the other system information; or, the response information includes: a first random access preamble identifier RAPID; or, the response information includes: the first RAPID and the broadcast identifier.

In an optional embodiment of this embodiment, the broadcast identifier includes a bitmap, wherein the bitmap is pre-configured by the network device, or predefined by a communication protocol.

In an optional embodiment of this embodiment, the response information includes: a broadcast identifier, the broadcast identifier is used to indicate success or failure of a request against the other system information, the apparatus further includes:

a determination module 984, configured to determine that the network device broadcasts the other system information in response that the broadcast identifier is a first value; or determine that the network device does not broadcast the other system information in response that the broadcast identifier is a second value.

In an optional embodiment of this embodiment, the response information includes: a first RAPID; the apparatus further includes:

a determination module 984, configured to determine that the network device broadcasts the other system information in response that the first RAPID matches a second RAPID of the random access preamble; or determine that the network device does not broadcast the other system information in response that the first RAPID does not match the second RAPID of the random access preamble.

In an optional embodiment of this embodiment, the response information includes: a first RAPID and a broadcast identifier, the apparatus further includes:

a determination module 984, configured to determine that the network device broadcasts the other system information in response that the first RAPID matches a second RAPID of the random access preamble and the broadcast identifier is a first value; or determine that the network device does not broadcast the other system information in response that the first RAPID does not match the second RAPID of the random access preamble or in response that the broadcast identifier is a second value.

In an optional embodiment of this embodiment, the receiving module 960 is configured to: determine a random access response RAR window according to a timing relationship; determine a target time point in the RAR window; receive the random access response at the target time point based on the scheduling information for the random access response.

In an optional embodiment of this embodiment, the receiving module 960 is configured to determine a number of receptions; receive the random access response in the RAR window according to the number of receptions.

In an optional embodiment of this embodiment, the receiving module 960 is configured that the terminal receives other system information when the response information indicates success.

In an optional embodiment of this embodiment, a difference between the target time point and a start moment of the RAR window is less than a first threshold; a difference between the target time point and an end moment of the RAR window is less than a second threshold.

Figure 10:
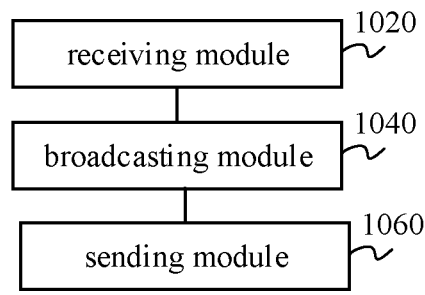
FIG. 10 is a block diagram of an apparatus for requesting other system information provided by an exemplary embodiment of the present disclosure.

FIG. 10 illustrates a block diagram of an apparatus for requesting other system information provided by an exemplary embodiment of the present disclosure. The apparatus can be implemented as a terminal or part of a terminal. The apparatus includes:

- a receiving module 1020, configured to receive a random access preamble, wherein the random access preamble is used for requesting other system information;
- a broadcasting module 1040, configured to broadcast scheduling information for a random access response; and
- a sending module 1060, configured to send the random access response according to the scheduling information for the random access response, wherein the random access response carries response information associated with the other system information.

In an optional embodiment of this embodiment, the broadcasting module 1040 is configured to broadcast a master information block MIB, wherein the MIB carries the scheduling information for the random access response;
or,
the broadcasting module 1040 is configured to broadcast a first system information block SIB1, wherein the SIB1 carries the scheduling information for the random access response.

In an optional embodiment of this embodiment, the scheduling information for the random access response includes at least one of:
time domain resource, frequency domain resource, Modulation and coding Scheme MCS and Transformer Block Size TBS.

In an optional embodiment of this embodiment, the scheduling information for the random access response is configured respectively based on different other system information.

In an optional embodiment of this embodiment, the response information includes: a broadcast identifier, wherein the broadcast identifier is used to indicate success or failure of a request against the other system information; or, the response information includes: a first random access preamble identifier RAPID; or, the response information includes: the first RAPID and the broadcast identifier.

The technical solution provided by the embodiments of the present application includes at least following beneficial effects.

By acquiring the scheduling information for the random access response in advance and receiving the random access response according to the time-frequency resources indicated by the scheduling information, the terminal does not need to use the manner of monitoring to receive the random access response and does not need to decode the RA-RNTI, thereby reducing the monitoring and decoding of the terminal in receiving message 2 and lowering the implementation complexity of the terminal.

Figure 11:
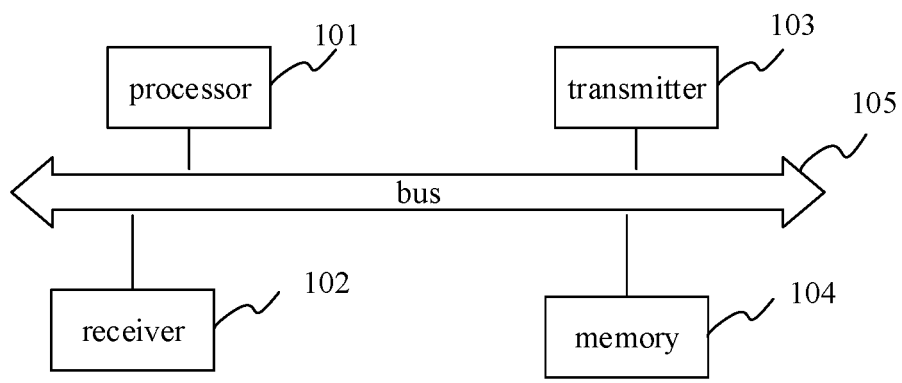
FIG. 11 is a schematic diagram of the structure of a communication device provided by an exemplary embodiment of the present disclosure.

FIG. 11 illustrates a schematic diagram of the structure of a communication device (network device or terminal) provided in an exemplary embodiment of the present disclosure. The communication device includes: a processor 101, a receiver 102, a transmitter 103, a memory 104, and a bus 105.

The processor 101 includes one or more processing cores. The processor 101 performs various functional applications as well as information processing by running software programs as well as modules.

The receiver 102 and transmitter 103 can be implemented as a communication component, which can be a communication chip.

The memory 104 is connected to the processor 101 via a bus 105.

The memory 104 may be used to store at least one instruction. The processor 101 is used to execute the at least one instruction to implement various steps in the method embodiments described above.

In addition, the memory 104 may be implemented by any type of volatile or non-volatile storage device or a combination thereof. The volatile or non-volatile storage devices includes, but not limited to: disks or optical disks, Electrically-Erasable Programmable Read Only Memory (EEPROM), Erasable Programmable Read Only Memory (EPROM), Static Random Access Memory (SRAM), Read-Only Memory (ROM), Magnetic Memory, Flash Memory, Programmable Read-Only Memory (PROM).

In exemplary embodiments, there is also provided a computer-readable storage medium. The computer-readable storage medium stores at least one instruction, at least one program, code set or instruction set therein. The at least one instruction, at least one program, the code set or instruction set is loaded and executed by the processor to implement the method for requesting other system information performed by a terminal or network device as provided in each of the above method embodiments.

A person of ordinary skill in the art may understand that all or some of the steps to implement the above embodiments may be accomplished by hardware, or may be accomplished by a program to instruct the relevant hardware. The program may be stored in a computer readable storage medium. The above mentioned storage medium may be read-only memory, disk or CD-ROM, etc.

The above mentioned are only optional embodiments of this application and are not intended to limit this application. Any modifications, equivalent replacements, improvements, and changes in the sequence of steps, or recombination of steps or components, etc., made within the spirit and principles of this application, shall be included in the scope of protection of this application.

What is claimed is:

1. A method for requesting other system information, comprising:
sending a random access preamble to a network device, wherein the random access preamble is configured for requesting other system information;
acquiring scheduling information for a random access response; and
receiving the random access response according to the scheduling information for the random access response, wherein the random access response carries response information associated with the other system information,
wherein receiving the random access response according to the scheduling information for the random access response comprises:
determining a random access response (RAR) window according to a timing relationship;
determining a target time point in the RAR window; and
receiving the random access response at the target time point based on the scheduling information for the random access response,
wherein a difference between the target time point and a start moment of the RAR window is less than a first threshold; and a difference between the target time point and an end moment of the RAR window is less than a second threshold.

2. The method according to claim 1, wherein the scheduling information for the random access response comprises at least one of following acts:
receiving a master information block (MIB) broadcast by the network device, wherein the MIB carries the scheduling information for the random access response;
receiving a first system information block (SIB1) broadcast by the network device, wherein the SIB1 carries the scheduling information for the random access response;
or,
acquiring predefined scheduling information for the random access response.

3. The method according to claim 1, wherein the scheduling information for the random access response comprises at least one of:
time domain resource;
frequency domain resource;
modulation and coding scheme (MCS); and
transformer block size (TBS).

4. The method according to claim 1, wherein the scheduling information for the random access response is configured respectively based on different other system information.

5. The method according to claim 1, wherein the response information comprises at least one of following identifiers:
a broadcast identifier, wherein the broadcast identifier is configured to indicate success or failure of a request for the other system information;
or,
a first random access preamble identifier (RAPID).

6. The method according to claim 5, wherein the broadcast identifier comprises a bitmap, wherein the bitmap is pre-configured by the network device, or predefined by a communication protocol.

7. The method according to claim 1, wherein the response information comprises: a broadcast identifier, the broadcast identifier is used to indicate success or failure of a request against the other system information, the method further comprises:
determining that the network device broadcasts the other system information in response that the broadcast identifier is a first value; or
determining that the network device does not broadcast the other system information in response that the broadcast identifier is a second value.

8. The method according to claim 1, wherein the response information comprises: a first RAPID; the method further comprises:
determining that the network device broadcasts the other system information in response that the first RAPID matches a second RAPID of the random access preamble; or
determining that the network device does not broadcast the other system information in response that the first RAPID does not match the second RAPID of the random access preamble.

9. The method according to claim 1, wherein the response information comprises: a first RAPID and a broadcast identifier, the broadcast identifier is configured to indicate success or failure of a request against the other system information, the method further comprises:
determining that the network device broadcasts the other system information in response that the first RAPID matches a second RAPID of the random access preamble and the broadcast identifier is a first value; or
determining that the network device does not broadcast the other system information in response that the first RAPID does not match the second RAPID of the random access preamble or in response that the broadcast identifier is a second value.

10. The method according to claim 1, further comprising:
determining a number of receptions; and
receiving the random access response in the RAR window according to the number of receptions.

11. A method for requesting other system information, comprising:
receiving a random access preamble, wherein the random access preamble is used for requesting other system information;
broadcasting scheduling information for a random access response; and
sending the random access response according to the scheduling information for the random access response, wherein the random access response carries response information associated with the other system information,
wherein the random access response is received by a terminal at a target time point, the target time point is determined in a random access response (RAR) window, the RAR window is determined according to a timing relationship,
wherein a difference between the target time point and a start moment of the RAR window is less than a first threshold; and a difference between the target time point and an end moment of the RAR window is less than a second threshold.

12. The method according to claim 11, wherein broadcasting scheduling information for a random access response comprises:
broadcasting a master information block (MIB), wherein the MIB carries the scheduling information for the random access response;
or,
broadcasting a first system information block (SIB1), wherein the SIB1 carries the scheduling information for the random access response.

13. The method according to claim 11, wherein the scheduling information for the random access response comprises at least one of parameters:
time domain resource, frequency domain resource, Modulation and coding Scheme (MCS), and Transformer Block Size (TBS).

14. The method according to claim 11, wherein the scheduling information for the random access response is configured respectively based on different other system information.

15. The method according to claim 11, wherein
the response information comprises: a broadcast identifier, wherein the broadcast identifier is used to indicate success or failure of a request against the other system information;
or,
the response information comprises: a first random access preamble identifier (RAPID);
or,
the response information comprises: the first RAPID and the broadcast identifier.

16. The method according to claim 15, wherein the broadcast identifier comprises a bitmap, wherein the bitmap is pre-configured by the network device, or predefined by a communication protocol.

17. An apparatus for requesting other system information, comprising:
at least one processor;
a transceiver connected to the at least one processor; and
a memory for storing instructions executable by the at least one processor,
wherein the at least one processor is configured to load and execute the executable instructions to implement a method for requesting other system information according to claim 11.

18. An apparatus for requesting other system information, comprising:
at least one processor;
a transceiver connected to the at least one processor; and
a memory for storing instructions executable by the processor,
wherein the at least one processor is configured to load and execute the executable instructions to:
send a random access preamble to a network device, wherein the random access preamble is used for requesting other system information;

acquire scheduling information for a random access response; and receive the random access response according to the scheduling information for the random access response, wherein the random access response carries response information associated with the other system information, wherein the at least one processor is further configured to:

determine a random access response (RAR) window according to a timing relationship;

determine a target time point in the RAR window; and receive the random access response at the target time point based on the scheduling information for the random access response, wherein a difference between the target time point and a start moment of the RAR window is less than a first threshold; and a difference between the target time point and an end moment of the RAR window is less than a second threshold.

* * * * *